United States Patent [19]
Diaz

[11] Patent Number: 4,943,233
[45] Date of Patent: Jul. 24, 1990

[54] USE OF DEWATERED OF DIGESTED SEWERAGE SLUDGE AS THE BLOATING AGENT

[75] Inventor: Manuel C. Diaz, Ontario, Calif.

[73] Assignee: Recycled Energy, Inc., Los Angeles, Calif.

[21] Appl. No.: 422,623

[22] Filed: Oct. 17, 1989

[51] Int. Cl.$^5$ .................... C04B 18/00; C04B 20/00; C04B 24/00; C04B 38/00
[52] U.S. Cl. ....................... 432/13; 501/155; 106/487; 106/776; 110/342; 110/790; 110/697; 110/486; 110/777
[58] Field of Search ............... 432/13, 14; 110/218, 110/219, 226, 229, 235, 236, 238, 245, 259, 266, 342, 344, 346; 501/155; 106/98

[56] References Cited

U.S. PATENT DOCUMENTS

| | | | |
|---|---|---|---|
| 2,414,734 | 1/1947 | Gelbman | 501/155 X |
| 3,801,262 | 4/1974 | Karkowski et al. | 432/13 |
| 3,957,528 | 5/1976 | Ott et al. | 501/155 X |
| 3,963,506 | 6/1976 | Shutt et al. | 501/131 |
| 3,998,650 | 12/1976 | Schmitt-Henco et al. | 106/120 X |
| 4,494,928 | 1/1985 | Rohrbach | 432/13 |
| 4,522,926 | 6/1985 | Felice | 501/130 X |
| 4,592,722 | 6/1986 | Heckman | 432/13 |
| 4,797,091 | 1/1989 | Neumann | 432/14 |
| 4,874,153 | 10/1989 | Hashimoto et al. | 501/155 X |

*Primary Examiner*—Henry A. Bennet
*Assistant Examiner*—C. Kilner

[57] ABSTRACT

A process for manufacturing expanded shale aggregate using dewatered digested sewerage sludge as the bloating agent for the shale and using high-lime blast furnace slag as the fluxing agent to lower the melting temperature of the mix and also using refuse derived fuel as the main fuel in the kiln.

1 Claim, No Drawings

USE OF DEWATERED OF DIGESTED SEWERAGE SLUDGE AS THE BLOATING AGENT

BACKGROUND

Waste products are either buried, stored, purified or salvaged. Sewer sludge is usually aerated to reduce the biological oxygen demand (BOD) and then runoff into a large body of water. Occasionally, its dilute form is salvaged for irrigation purposes. However, it is also possible to utilize the sewerage sludge as the bloating agent in the manufacture of expanded shale aggregates by mixing digested sewerage sludge with shale and burning the mix in a vertical kiln or rotary kiln at 2000° C. It is also possible to lower the melting point of shale by mixing high-lime blast furnace slag as the fluxing agent. Furthermore, the high-lime blast furnace slag can also be used to control the sulfur dioxide emission of the kiln. The sulfur and other acidic gases formed in the burning of the shale, dewatered digested sewerage sludge and refuse derived fuel reacts with the calcium oxide present in the high-lime blast furnace slag forming solid calcium sulfate and other calcium salts which are retained in the expanded shale aggregate, thereby reducing the acidic pollutants emitted into the atmosphere. If the light-weight expanded shale aggregates produced in this manner uses dewatered digested sewerage sludge, high-lime blast furnace slag and refuse derived fuel to fire the kiln which are all waste products, a new useful composition is produced from these three waste ingredients. An important unanticipated result in using the three waste products namely, dewatered digested sewerage sludge, high-lime blast furnace slag and refuse derived fuel products complimentary characteristic wherein the burning of refuse derived fuel at 2000° C. deodorizes the refuse derived fuel and the dewatered digested sewerage sludge and also the acidic emission produced in the burning of refuse derived fuel and the digested dewatered sewerage sludge reacts with the calcium oxide in the high-lime blast furnace slag thereby neutralizing the acid and retaining reaction products in the expanded shale aggregates resulting in the reduction of air pollution.

EMBODIMENT OF THE PROCESS

Expanded shale aggregates is usually produced by burning a mixture of ground shale or clay with at least 25% water in a vertical kiln or rotary kiln at 2000° C. and quenching or cooling the molten mixture in water. The typical fuel used is either coal, oil or gas.

When the shale is mixed with dewatered digested sewerage sludge and high-lime blast furnace slag and ground in a typical ball mill a hydrated clay-like soil product is produced. The mixture should be 60% digested sewerage sludge, 30% shale, and 10% high-lime blas furnace slag.

The hydrated clay-like soil produced in this manner can be used to produce light-weight expanded shale aggregates by burning the hydrated clay-like soil in a vertical kiln or rotary kiln at 2000° C. using refuse derived fuel as the main fuel in the kiln.

This light-weight expanded shale aggregate can be used as rock aggregate in the production of light-weight concrete panels, light-weight concrete bridge decking and light-weight concrete blocks.

I claim:

1. A process to produce light-weight expanded shale aggregates using basic ingredients of shale and dewatered digested sewerage sludge as a bloating agent and high-lime blast furnace slag as fluxing agent and also using refuse derived fuel as a main fuel in the kiln, comprising the steps of
   Crushing, grinding and mixing said shale dewatered digested sewerage sludge and high-lime blast furnace slag in a conventional rock crusher and ball mill, producing a hydrated clay-like soil product,
   Mixing said shale, dewatered digested sewerage sludge and high-like blast furnace slag in weight proportion, as follows:
   60% dewatered digested sewerage sludge,
   30% shale,
   10% high-lime blast furnace slag,
   Burning the hydrated clay-like soil product in a vertical kiln or rotary kiln at 2000° C. using refuse derived fuel and producing light-weight expanded shale aggregates.

* * * * *